United States Patent
Ford

(10) Patent No.: US 8,478,998 B2
(45) Date of Patent: Jul. 2, 2013

(54) AUTHENTICATED COMMUNICATION USING A SHARED UNPREDICTABLE SECRET

(75) Inventor: Warwick Ford, Cambridge, MA (US)

(73) Assignee: Symantec Corporation, Mountain View, CA (US)

( * ) Notice: Subject to any disclaimer, the term of this patent is extended or adjusted under 35 U.S.C. 154(b) by 726 days.

(21) Appl. No.: 11/340,948

(22) Filed: Jan. 27, 2006

(65) Prior Publication Data

US 2007/0192829 A1    Aug. 16, 2007

Related U.S. Application Data

(63) Continuation of application No. 09/921,265, filed on Aug. 1, 2001, now abandoned.

(60) Provisional application No. 60/226,429, filed on Aug. 18, 2000.

(51) Int. Cl.
*H04L 9/16* (2006.01)
*H04L 9/32* (2006.01)

(52) U.S. Cl.
USPC ............ 713/168; 713/171; 380/260; 380/262

(58) Field of Classification Search
USPC ..................... 380/262, 260; 713/168, 171
See application file for complete search history.

(56) References Cited

U.S. PATENT DOCUMENTS

| | | | |
|---|---|---|---|
| 4,200,770 A | 4/1980 | Hellman et al. | |
| 5,146,498 A | 9/1992 | Smith | |
| 5,323,464 A * | 6/1994 | Elander et al. | 713/191 |
| 5,613,214 A | 3/1997 | Shirasawa et al. | |
| 5,661,807 A | 8/1997 | Guski et al. | |
| 5,815,665 A | 9/1998 | Teper et al. | |
| 5,940,007 A * | 8/1999 | Brinkmeyer et al. | 340/825.69 |
| 5,953,420 A | 9/1999 | Matyas, Jr. et al. | |
| 5,991,405 A * | 11/1999 | Mills | 380/247 |

(Continued)

OTHER PUBLICATIONS

Lamport, Leslie, "Password Authentication With Insecure Communication", *Communications of the ACM*, Association for Computing Machinery, Nov. 1, 1981, pp. 770-772, vol. 24, No. 11, New York, U.S.A.

(Continued)

*Primary Examiner* — Matthew Henning
(74) *Attorney, Agent, or Firm* — Lowenstein Sandler LLP

(57) ABSTRACT

Systems, methods and computer readable media for authenticating one or more client devices (1) to a server (5). A shared unpredictable secret (50) is generated. The shared unpredictable secret (50) is stored in the client device (1) and in the server device (5). The client device (1) proves possession of the correct shared unpredictable secret (50) to the server (5). The shared unpredictable secret (50) is replaced by a new shared unpredictable secret (54) each time the client device (1) logs in to the server device (5).

17 Claims, 5 Drawing Sheets

U.S. PATENT DOCUMENTS

| | | | |
|---|---|---|---|
| 5,995,624 A | 11/1999 | Fielder et al. | |
| 6,029,150 A | 2/2000 | Kravitz | |
| 6,148,404 A | 11/2000 | Yatsukawa | |
| 6,182,220 B1* | 1/2001 | Chen et al. | 713/182 |
| 6,240,184 B1 | 5/2001 | Huynh et al. | |
| 6,445,780 B1* | 9/2002 | Rosset et al. | 379/114.17 |
| 6,757,825 B1 | 6/2004 | MacKenzie et al. | |
| 6,802,000 B1* | 10/2004 | Greene et al. | 713/168 |
| 6,938,157 B2 | 8/2005 | Kaplan | |
| 7,032,109 B1* | 4/2006 | Rosset et al. | 713/151 |
| 2001/0048745 A1* | 12/2001 | Sheymov et al. | 380/247 |

OTHER PUBLICATIONS

Menezes, et al., *Handbook of Applied Cryptography*, CRC Press Series on Discrete Mathematics and its Applications, 1997, entire book, Boca Raton, Florida, U.S.A.

Van Oorschot, *Handbook of Applied Cryptography*, CRC Press Series on Discrete Mathematics and its Applications, 1997, pp. 395-397, Boca Raton, Florida, U.S.A.

Wikipedia, *S/Key*, Website, available at http://en.wikipedia.org/wiki/S/KEY (last accessed Apr. 8, 2010).

* cited by examiner

AUTHENTICATED COMMUNICATION USING A SHARED UNPREDICTABLE SECRET

CROSS-REFERENCE TO RELATED APPLICATION(S)

This application is a continuation of U.S. patent application Ser. No. 09/921,265, originally entitled "Countering Credentials Copying," filed Aug. 1, 2001 now abandoned; which claims priority from U.S. Provisional Patent Application Ser. No. 60/226,429, "Countering Credentials Theft," filed on Aug. 18, 2000. The subject matter of all of the foregoing are incorporated herein by reference in their entirety.

BACKGROUND OF THE INVENTION

1. Field of the Invention

This invention pertains to the field of secure communications between and among digital devices such as computers, and, specifically, pertains to techniques for thwarting the copying of credentials by nefarious persons or otherwise.

2. Description of the Related Art

Diffie-Hellman key exchange, as described in U.S. Pat. No. 4,200,770, is a mechanism to permit two entities to have a shared secret; the secret could be an encryption key. In the present invention, shared unpredictable secret 50 is not an encryption key.

SUMMARY OF THE INVENTION

The present invention comprises systems, methods, and computer readable media for authenticating a client device (1) to a server device (5). A preferred method comprises the steps of generating a shared unpredictable secret (50), storing the shared unpredictable secret (50) in the client device (1) and in the server device (5), and requiring the client device (1) to prove that it contains the correct shared unpredictable secret (50) as a precondition to allowing the client device (1) to log in to the server device (5). The shared unpredictable secret (50) is replaced by a new shared unpredictable secret (54) each time the client device (1) logs in to the server device (5).

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Figure 1:
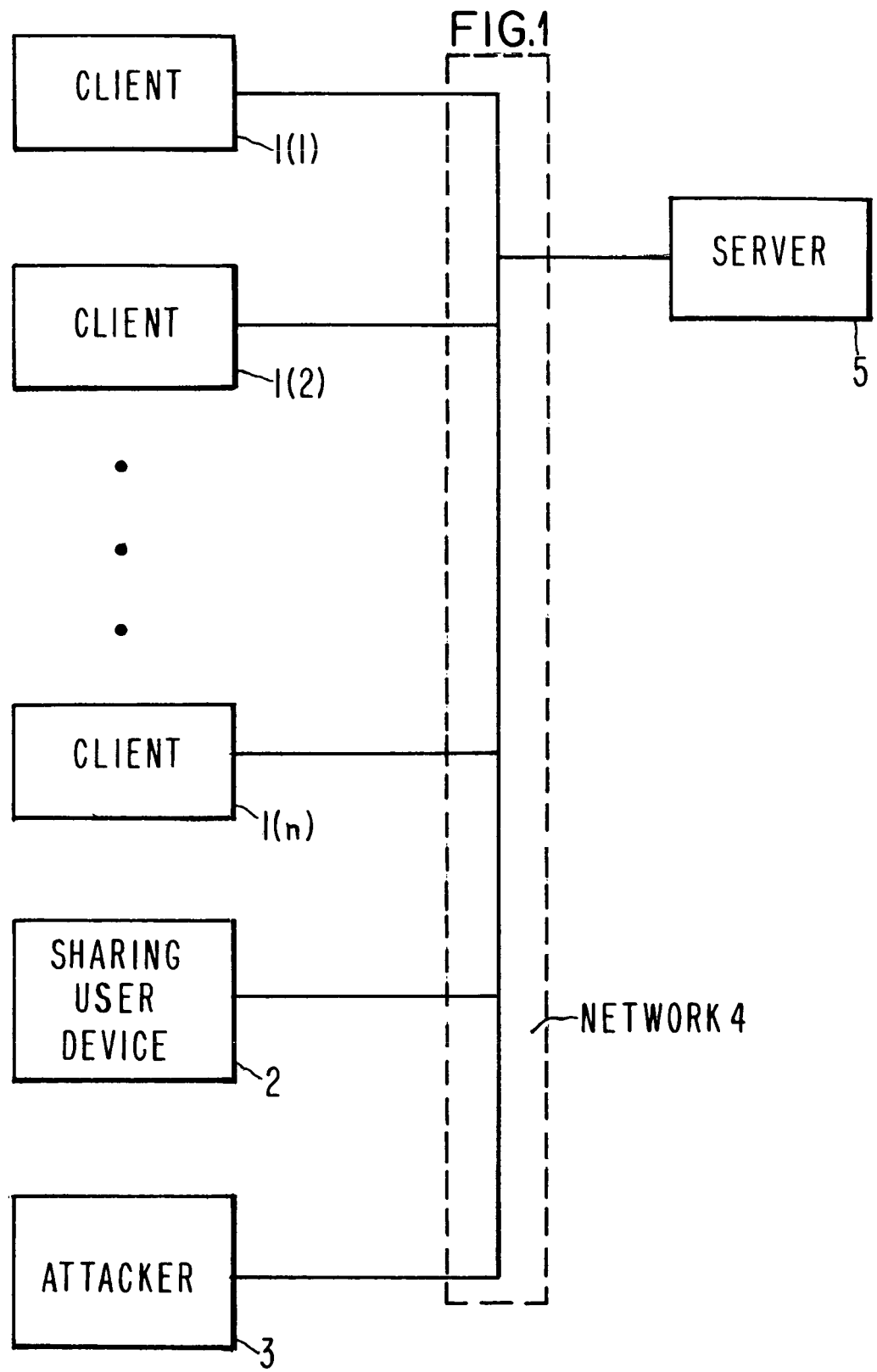
FIG. 1 is a block system-level diagram of a preferred embodiment of the present invention.

As used in the present patent application, client (sometimes referred to as "client device") 1 can be any digital device, e.g., a personal computer, mobile phone, smartcard, Internet appliance, or any other network accessible device. There may be one client 1 or, as illustrated in FIG. 1, a finite number n of clients 1. Each client 1 wishes to communicate with an infrastructural component that is referred to in the present patent application as a server (or "server device") 5. Server 5 may provide any type of service to client 1. For example, server 5 might be an Internet service provider or a telephone network access point. The communications link between client 1 and server 5 may be any link, such as a wireless link, a wired link, or a link over a network 4, which may be an open network such as the Internet. The communications link 4 may be an encrypted connection such as SSL. The initiation of a communication session between client 1 and server 5 is referred to herein as a log-in.

One concern in such an environment pertains to credentials sharing. In this scenario, a person who has access to a client device 1 voluntarily shares his personal credentials, such as a password or private cryptographic key, with other user devices 2. All of these user devices 2 employ the user account of the original user. Two problems that arise from this scenario are: 1) It is difficult for server 5 to hold particular users 2 accountable for their actions when using the services provided by server 5, since some or all users 2 are indistinguishable from each other; and 2) Users may fraudulently avoid paying subscription fees that are designed for payment on a per-user basis.

Another concern is outright credentials theft. In this scenario, a nefarious person having access to a client-like device, referred to as "attacker 3" in FIG. 1, penetrates a legitimate client device 1 copies stored credentials data from client device 1 into attacker device 3, perhaps supplements this thievery with a determination of other information such as the user's password, personal identification number, or social security number from other sources, and then masquerades as the legitimate user from the attacker device 3. When the client device 1 being attacked is a hardware device and not a software module, this scenario is sometimes referred to as "device cloning". Client devices 1 that are typically cloned include mobile telephones and smartcards.

The present invention also applies to the copying of a portable credentials storage medium such as a magnetic stripe card or ticket if that medium is writable as well as readable by the terminal device in which it is used. In this case, the term client device 1 is taken to mean the combination of the portable credentials storage medium and the terminal device in which it is currently inserted.

The present invention uses a method of stateful authenticators to provide a low cost, low overhead means of detecting when one user account is being used for more than one client device 1 over a period of time. Specifically, the stateful authenticator used herein is a shared unpredictable secret 50. The present invention has utility in countering credentials sharing behavior by effectively restricting use of a user account to one or a limited number of client devices 1. The invention also counters credentials theft by means of detecting the use of one user account from more than one client device 1 after stored credentials have been copied between client devices 1, regardless of how easy or difficult it was to copy the credentials from the original device 1.

All of the method steps illustrated herein describe modules that can be implemented in hardware, software, and/or firmware. Some of these modules reside on the client device 1 and some on the server device 5, as will be understood by examining the Figures in conjunction with the following description.

The method will first be described with respect to a special case in which there is but one legitimate client device 1. There are two phases of the method of the present invention: a registration/reset phase and a log-in phase.

Figure 2:
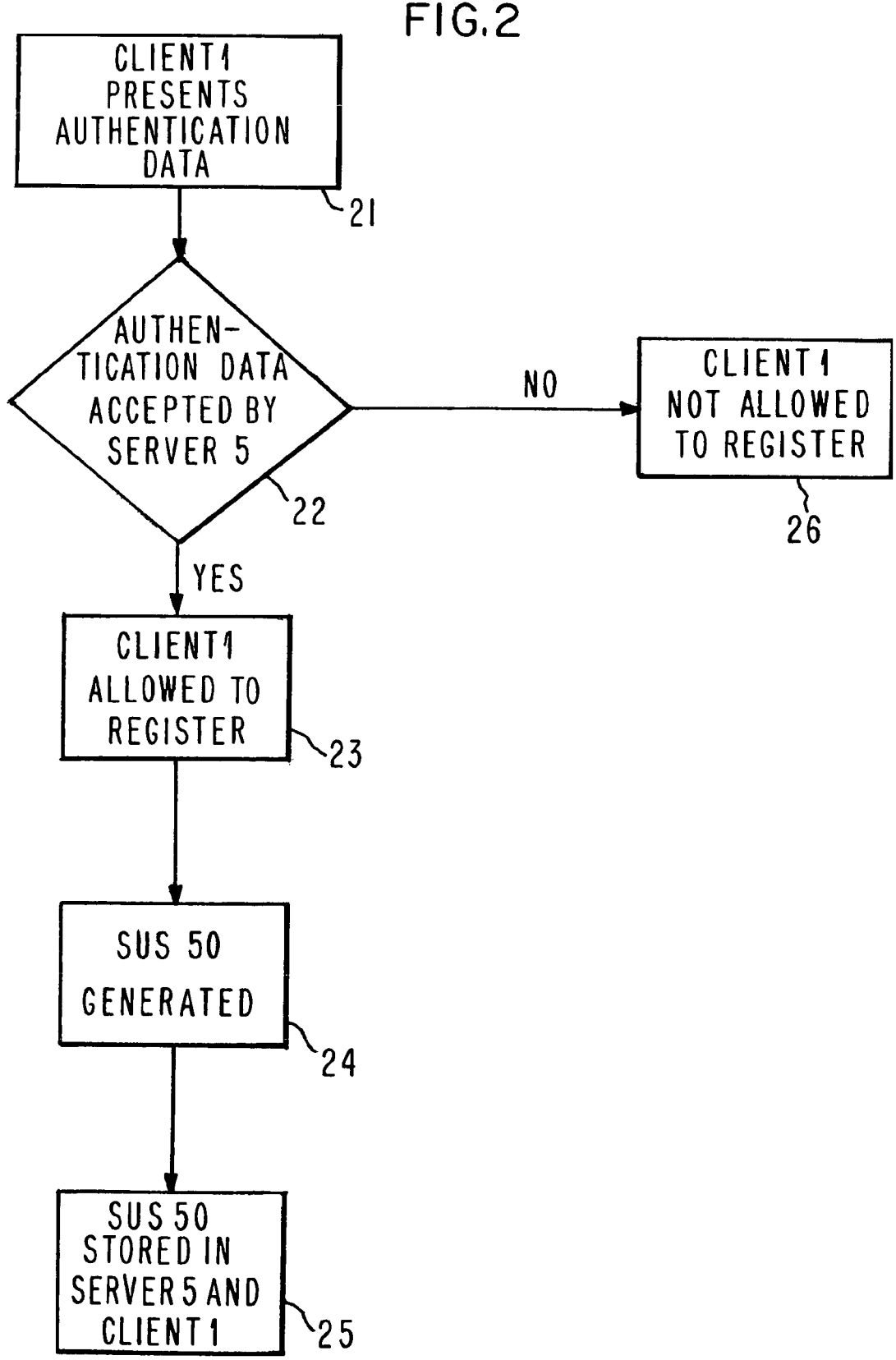
FIG. 2 is a flow diagram of a preferred embodiment of the registration/reset phase of the present invention.

FIG. 2 illustrates the registration/reset phase. In step 21, client 1 typically presents a user's authentication data to server 5. The ensuing dialog between client 1 and server 5 is geared to determining whether the user associated with client 1 is legitimately associated with a claimed user account. The authentication data presented by client 1 may include private personal data, a response to a pre-established challenge question posed by server 5, a biometric input such as a fingerprint or an eyeball scan, etc. Alternatively, the registration/reset phase may involve the user making a payment, in which case authentication data may or may not need to be presented by client 1 to server 5. The payment can be made by the client 1 securely crediting server 5's account, and can be made online or offline. The registration/reset phase is typically undertaken less frequently than the log-in phase.

At step 22, server 5 decides whether the authentication data presented by client 1 are acceptable. If not, client 1 is not allowed to register (step 26). If acceptable, client 1 is allowed to register (step 23). In this eventuality, the shared unpredictable secret 50 is generated (step 24).

Figure 5:
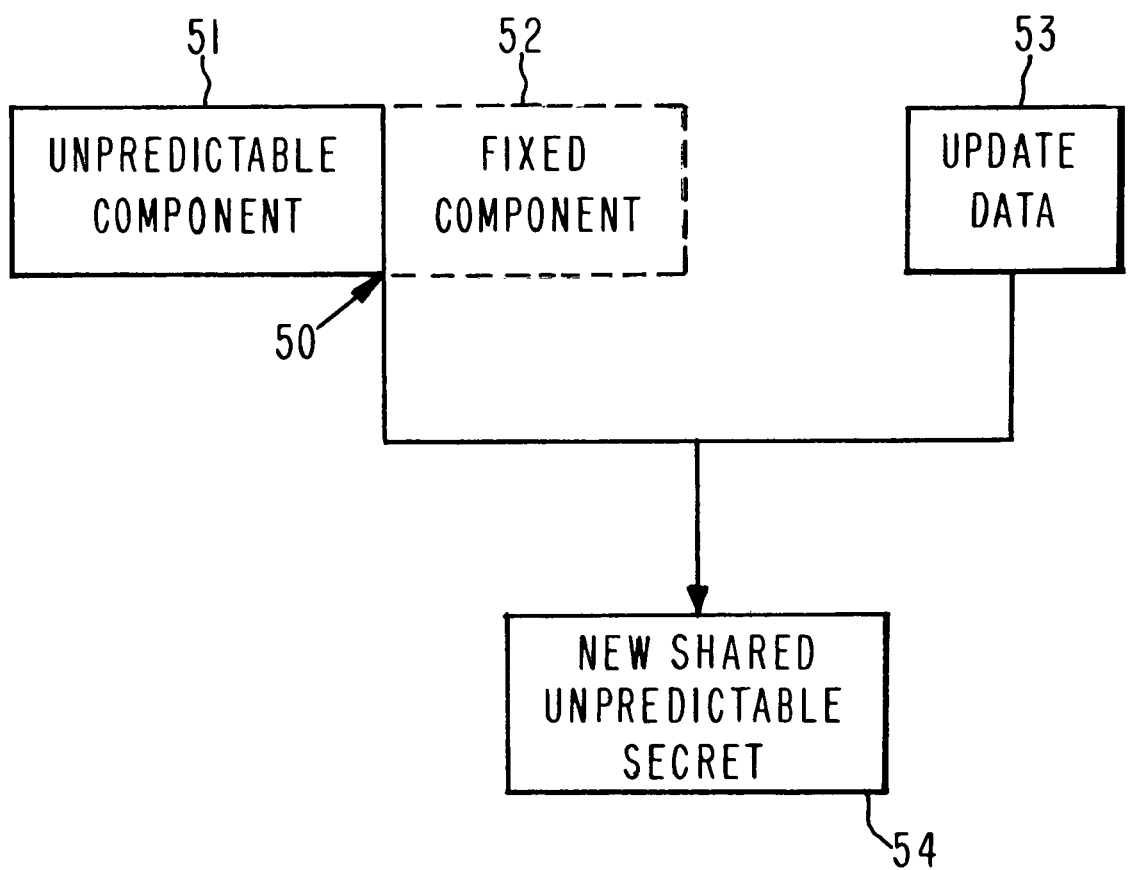
FIG. 5 is an illustration of shared unpredictable secret 50 and its progeny.

As illustrated in FIG. 5, the shared unpredictable secret (SUS) 50 comprises an unpredictable component 51 and an optional fixed component 52. Unpredictable component 51 may be generated by a random number generator or a pseudo-random number generator. Typically, unpredictable component 51 is generated at server 5 and communicated to client 1, but it may also be generated at client 1, or at a combination of server 5 and client 1. As an alternative to communicating unpredictable component 51 to client 1, unpredictable component 51 may be pre-installed in client device 1 during manufacture or during a device 1 personalization process.

When used, fixed component 52 typically comprises identification information. For example, fixed component 52 may be a serial number of the client device 1. This could be useful when there are two or more client devices 1 associated with the same user account number. Conversely, fixed component 52 could be the user account number when there is more than one user account number associated with the same client device 1. This situation may occur, for example, when a user has one account number for business use and another account number for personal use; or when two users share the same cellular telephone 1; or when the client device 1 is a terminal into which users insert their credentials storage media.

Typically, after server 5 has generated SUS 50, server 5 transmits SUS 50 to client 1. The transmission is preferably encrypted, for reasons of security. Any type of encryption, including symmetric or asymmetric encryption, may be used. Alternatively, an SUS 50 having an unpredictable component 51 is generated by the aforementioned Diffie-Hellman key exchange technique, or pre-installed in device 1 as described previously. The same SUS 50 is stored in both server 5 and client 1 (step 25). SUS's 50 may be stored in a secure fashion, such as using tamper-resistant hardware protection, e.g., epoxied integrated circuits, or by means of dynamically changing the location of SUS's 50 (and new SUS's 54) in storage.

Figure 3:
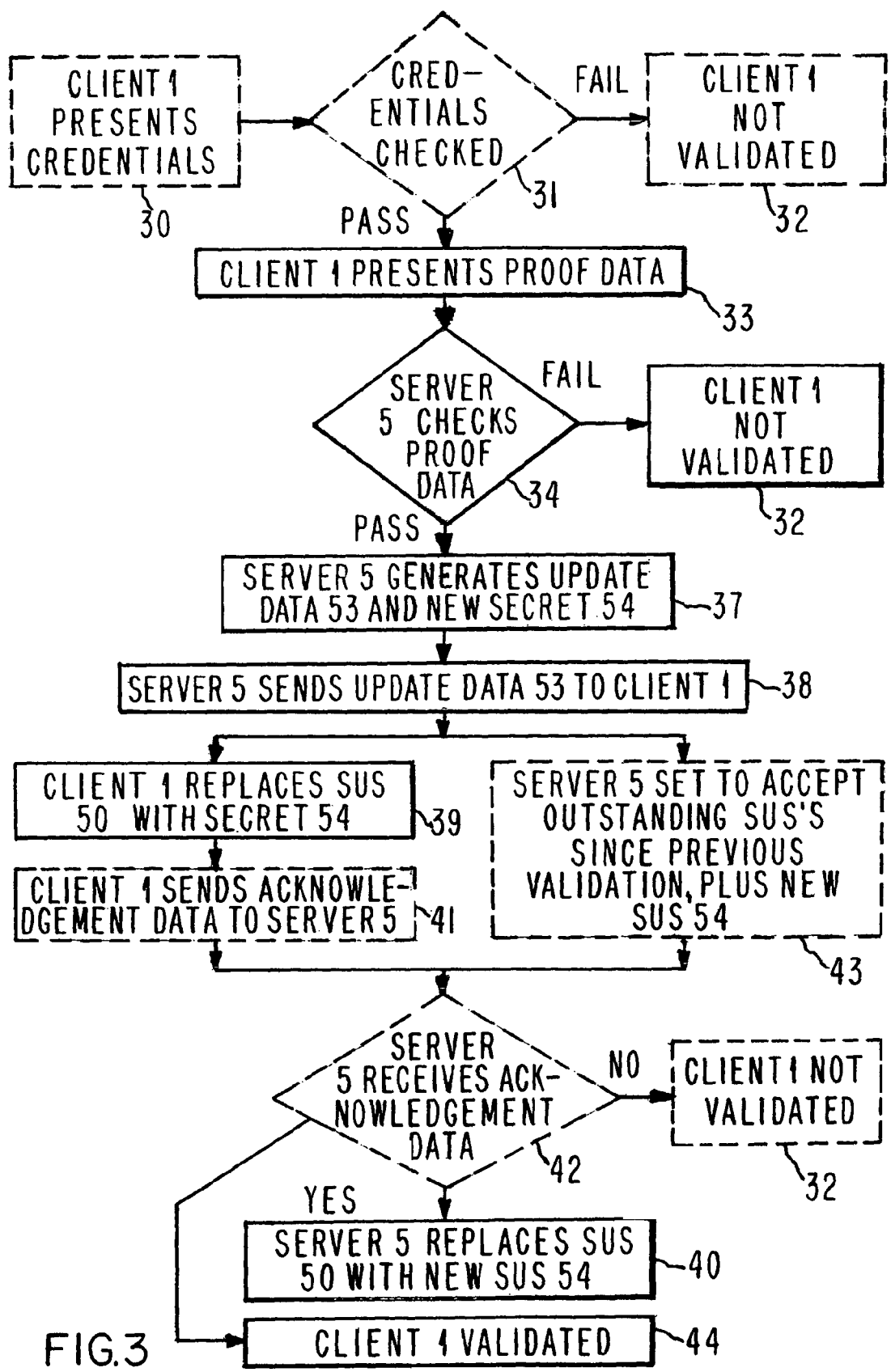
FIG. 3 is a flow diagram of a preferred embodiment of the log-in phase of the present invention.

FIG. 3 illustrates the basic method of the log-in phase. The log-in, at least for legitimate users, is not meant to be attempted until after the registration/reset phase has successfully concluded. Steps 30, 31, and 32 are optional. At step 30, client 1 presents credentials to server 5. The credentials may include a password, personal identification number (PIN), a transformed (e.g. hashed) password, biometric signature, portable credentials medium indentifier, or cryptographic authentication proof generated from a private cryptographic key. Since log-ins normally occur more frequently than registration/resets, the character and content of the credentials and procedure are such that the server's check of the credentials is typically simpler and faster than the server's check of the user's authentication data in previously-described step 21. In step 31, server 5 checks the credentials. If the check fails, typically the client is not validated (step 32).

If step 32 is entered, one or more things may happen. For example, client 1 may be totally rejected and not allowed to be validated ever again. Less onerously, client 1 could be given reduced privileges, such as the ability to read a Web page stored on server 5 but not to conduct any financial transactions thereon; or client 1 could be made to re-enter the registration/reset phase.

If the check passes, the method moves to step 33, where client 1 presents proof data to server 5. The proof data allows server 5 to verify that client 1 holds a correct secret 50, 54. (Normally, the secret is SUS 50. However, the secret could be new SUS 54, in the case where the log-in is a subsequent log-in following the re-set of server 5 as described in conjuction with step 43, below. For purposes of simplifying this discussion, it will be assumed that the proof data are computed upon SUS 50.) It is desirable that SUS 50 itself be not directly communicated over an open network 4 lest it be intercepted by a nefarious person. One method by which client 1 computes proof data without revealing SUS 50 itself is for client 1 to compute a one-way function of SUS 50. The one-way function is typically a cryptographic hash function. Then, at step 34, server 5 checks the proof data by applying its (server 5's) proof data generation algorithm to its (server 5's) stored version of SUS 50. If the proof data generated by server 5 matches the proof data presented by client 1, client 1 has passed the test, and the method proceeds to step 37. Otherwise, client 1 has failed the test and is not validated at step 32. Step 32 operates as previously described.

At step 37, update data 53 and a new shared unpredictable secret 54 are generated, typically by sever 5. On FIG. 3 (boxes 37 and 39), item 54 is referred to as a "secret" rather than a "shared unpredictable secret", because the contents of the storage area that server 5 uses for SUS's are not replaced with new SUS 54 until step 40 is executed, below. Thus, the secret is not yet "shared". Then, at step 38, server 5 sends update data 53 to client 1. Update data 53 is such that client 1 and server 5 are able to generate new SUS 54 from the most recent version of SUS 50, by means of applying update data 53 thereto. Typically, the step of applying update data 53 to SUS 50 comprises computing a one-way function of the combination of SUS 50 and update 53. For example, update data 53 could be a new random or pseudo-random number that client 1 and server 5 XOR with old SUS 50 in order to generate new SUS 54. Alternative to the use of update data 53, server 5 could send an encrypted new SUS 54 to client 1, but the advantage of sending update data 53 is that update data 53 does not have to be encrypted, thus making for a simpler and less cumbersome protocol. In an alternative embodiment, in situations where the optional acknowledgement data are used (see below), server 5 sends to client 1 an old SUS 50 that hasn't been acknowledged yet.

At step 39, client 1 updates its (client 1's) storage area that is allocated to SUS's with new secret 54. Client 1's storage area may be on a portable credentials storage medium.

Steps 41, 42, and 43 are optional. Without steps, the method illustrated in FIG. 3 works well when the communications channel 4 is clean and uncorrupted, but a potential problem arises in the case of a noisy or corrupted channel 4: update data 53 could be lost in transit between client 5 and server 1, or client 1 could fail to correctly store new secret 54.

The inclusion of steps 41, 42, and 43 resolves the problem of noisy or corrupted channels 4 or a malfunctioning client device 1, through the use of acknowledgement (ACK) data. In step 41, client 1 sends the ACK to server 5 after client 1 has successfully received update data 53 and stored the new secret 54. The ACK may optionally contain proof data allowing server 5 to verify that client 1 has successfully computed the new SUS 54. The proof data should not be the same proof data as used in step 33; otherwise, a replay attack would be possible.

At step 43, server 5 is set (e.g., programmed) to accept proof data emanating from any SUS's since the previous validation, plus new SUS 54. Another way of saying this is that server 5 is adapted to accept from client 1 any proof data that are generated from a secret that is newer than the secret for which the most recent acknowledgement data have been received by server 5. Thus, if the situation is that client 1 has received the update data 53, but for some reason the ACK has been lost in transit, during the next log-in, client 1 at step 33 will be presenting proof data emanating from new SUS 54, and server 5 at step 34 will be programmed to accept said data. If, on the other hand, update data 53 were not received by client 1, then, during the next log-in, client 1 at step 33 will be presenting proof data emanating from an old SUS 50, and server 5 at step 34 will be programmed to accept said data.

Step 42 illustrates the reality that server 5 may or may not receive the ACK, either because the update 53 were lost in transit, the ACK was lost in transit, or the client device 1 failed. If server 5 receives the ACK within a preselected "time-out" period, then client 1 is validated at step 44 and step 40 is entered into. At step 40, server 5 updates its (server 5's) storage area that is allocated to SUS's with new secret 54. Thus, new secret 54 becomes a new shared unpredictable secret, because it is now shared by client 1 and server 5. As a substep to step 40, server 5 deletes SUS 50 and any older SUS's from its list of acceptable SUS's. Thus, in future log-in attempts, both client 1 and server 5 will have stored therewithin new SUS 54; and the proof data (of client 1 in step 33 and server 5 in step 34) will be based upon new SUS 54.

If, on the other hand, server 5 does not receive at step 42 the ACK from client 1 during the time-out period, client 1 is not validated at step 32, which executes as described previously.

The protocols described herein have the following desirable properties: 1) Any SUS (50) value produces no more than one validation; and 2) If the protocol fails at any stage, both client 1 and server 5 are left in a state that a new invocation of the protocol will operate correctly.

Optionally, for example in conjunction with step 34, server 5 maintains an audit trail of log-in attempts, noting in particular those log-in attempts in which the step 34 checks have failed. Each audit record should contain the then current values of old SUS 50 and new SUS 54. In the event a legitimate user disputes accountability for actions attributed to use of his account, if server 5 maintains an audit trail of log-in attempts, the service provider or systems administrator can use the audit trail in resolving such disputes.

By using the techniques described herein, any user possessing or knowing correct credentials and attempting a log-in from a client device 1 that holds the correct SUS 50 will succeed in being validated, even in the event a log-in sequence is not successfully completed, owing, for example, to a communication or system failure.

The present invention automatically protects against message replay, i.e., the situation where an eavesdropper records a session and plays it back. This is because a new SUS 54 is generated at each successful validation.

If the legitimate user of the credentials voluntarily shares his credentials with one or more other users who will be operating from what in essence becomes an illegitimate client device 2, only one client (legitimate client 1 or illegitimate client 2) can successfully log in subsequently without server 5 invoking special action, such as causing the requesting client 1,2 to re-execute the registration/reset phase. This represents a disincentive for the legitimate user to share his credentials, since his own usage of his account will be negatively impacted.

If the legitimate user's credentials are copied in a credentials theft, then one of the following scenarios will subsequently occur:

1) The legitimate client 1 logs in again before the attacker 3 attempts to masquerade as a legitimate user. In this case, the attacker 3 log-in will be alerted to the server 5 and consequently be subject to special action, such as rejection outright or granting of reduced privileges.

2) The attacker 3 logs in before legitimate client 1 logs-in again. In this case, attacker 3 can successfully masquerade as a legitimate user up to the time of the legitimate user's next log-in. On the legitimate user's next log-in, server 5 will be alerted and special action taken. This special action might include out-of-band communication with the legitimate user, investigation of the situation, and consequent shut-out of attacker 3 from further validations.

Figure 4:
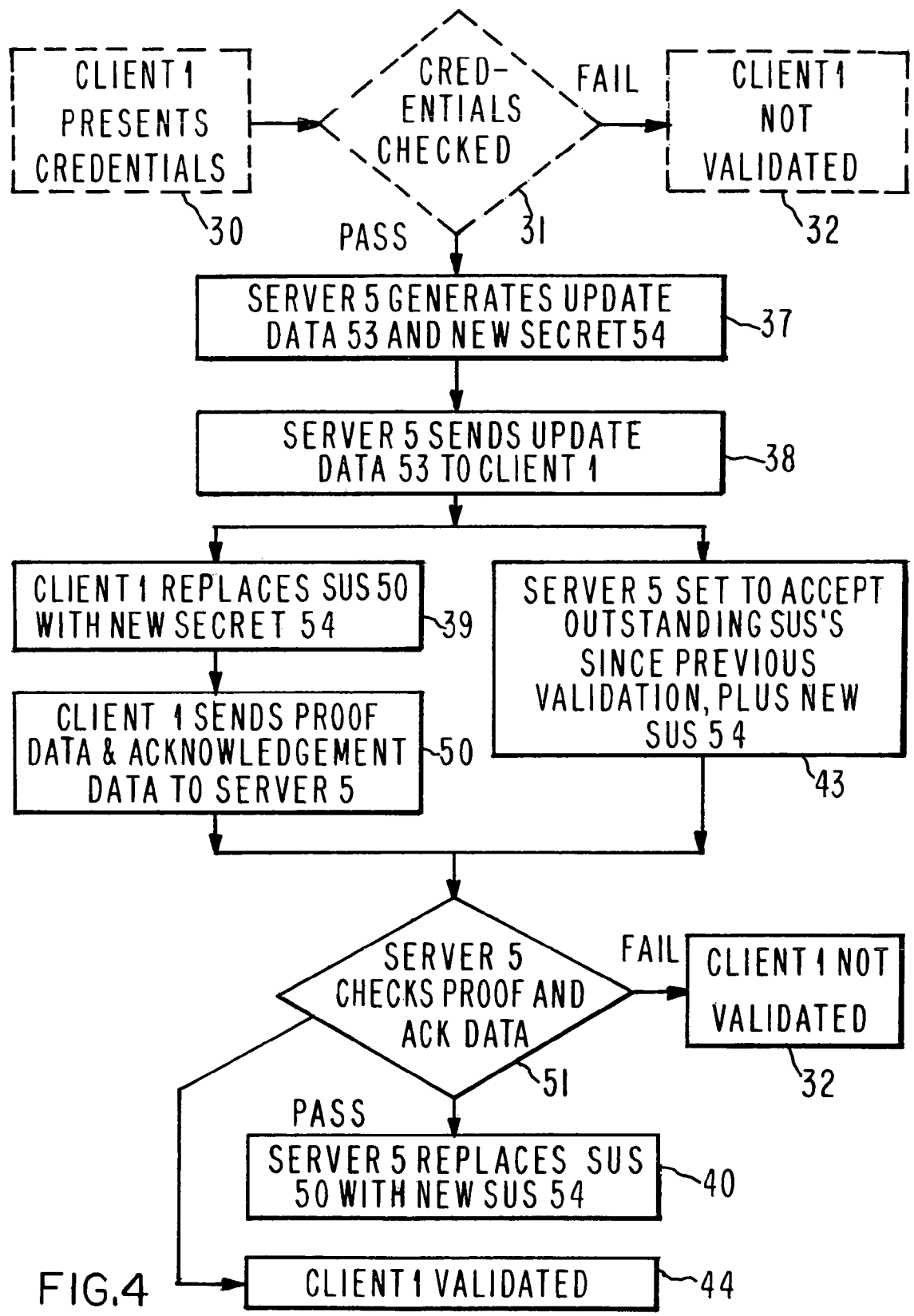
FIG. 4 is a flow diagram illustrating an alternative embodiment of the method illustrated in FIG. 3.

An alternative embodiment is illustrated in FIG. 4. The method of claim 4 is identical to the method of FIG. 3 wherein acknowledgement data are used, except that steps 33 and 34 are consolidated into steps 41 and 42. Thus, in the FIG. 4 embodiment, unlike the FIG. 3 embodiment, the presentation of proof data by client 1 and the checking of the proof data by server 5 are not performed prior to server 5 generating update data 53 and new secret 54 in step 37.

Step 50 of FIG. 4 replaces step 41 of FIG. 3. In step 50, client 1 sends both the proof data and the acknowledgement data to server 5. The proof data are computed on the new secret 54. The proof data could serve a double role as proof data and acknowledgement data. In this case, there is no need for acknowledgement data separate and apart from the proof data.

Step 51 of FIG. 4 replaces step 42 of FIG. 3. In step 51, server 5 checks both the proof data and the acknowledgement data, or, in the case where the proof data serve the double role as proof data and acknowledgement data, the proof data.

As stated previously, there may be legitimate use of a number n of different client devices 1 by a single legitimate user. In this case, server 5 holds current SUS's 50 and new SUS's 54 for each client device 1, and considers each client device 1 to be legitimate; and each client device 1 has its own unique SUS 50 and new SUS 54. The number n of clients 1 may be restricted in accordance with local policy. In this scenario, SUS's 50, 54 are respectively unique from one device 1 to the next. The registration/reset process has to be undertaken by each client device 1 to establish each SUS 50. In all other respects, the invention is the same as described above in conjunction with the single client 1 embodiment.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A method for validating a client device by a server device during a registration phase of the client device with the server device, the method comprising:
   generating a first shared unpredictable secret comprising an unpredictable component and a fixed component, wherein the fixed component remains the same during a user log-in phase that occurs after completion of the registration phase;
   storing the first shared unpredictable secret in the server device;
   sending, by the server device, update data to the client device, wherein the update data is to be applied to the first shared unpredictable secret by the client device to generate a second shared unpredictable secret, and wherein the second shared unpredictable secret comprises the same fixed component;
   accepting, by the server device, the first shared unpredictable secret as the correct shared unpredictable secret to validate the client device for requests for validation until the server device receives acknowledgement data to confirm that the client device has replaced the first shared unpredictable secret with the second shared unpredictable secret;
   accepting, by the server device, the second shared unpredictable secret as the correct shared unpredictable secret to validate the client device for requests for validation;
   receiving, by the server device prior to receiving the acknowledgment data, first proof data from the client device, wherein the first proof data is derived from the first shared unpredictable secret using a client proof data generation algorithm and the first proof data does not divulge the first shared unpredictable secret, wherein the client proof data generation algorithm comprises a one-way function;
   verifying, by the server device, the first proof data using a server proof data generation algorithm consistent with the client proof data generation algorithm used by the client device, wherein the server proof data generation algorithm comprises a one-way function; and
   upon determining, by the server device, that the first proof data presented by the client device was generated from the same first shared unpredictable secret stored in the server device, validating, by the server device, the client device.

2. The method of claim 1 wherein the first shared unpredictable secret is generated in the server device during the registration phase that occurs prior to the user log-in phase.

3. The method of claim 2 wherein the registration phase has faster checking of authentication data presented by the client device than does the checking of client device data during the user log-in phase.

4. The method of claim 2 wherein, during the registration phase, the client device is required to make a payment to the server device.

5. The method of claim 1 wherein the first shared unpredictable secret is generated by a random number generator or a pseudo-random number generator.

6. The method of claim 1 wherein multiple client devices request validation by the server device; and each of the client devices has a unique shared unpredictable secret that it shares with the server device.

7. The method of claim 1 wherein, following the validation of the client device, the server device generates the second shared unpredictable secret by applying the update data to the first shared unpredictable secret, discards the first shared unpredictable secret, and stores within the server device the second shared unpredictable secret.

8. The method of claim 1 wherein:
   the server device generates the update data using a random number generator or a pseudo-random number generator, wherein the update data is to be applied to the first shared unpredictable secret by the client device by computing a one-way function of a combination of the first shared unpredictable secret and the update data.

9. The method of claim 1 wherein the server device receives the acknowledgement data from the client device to confirm that the client device has replaced the first shared unpredictable secret with the second shared unpredictable secret.

10. The method of claim 9 wherein, in response to the server device receiving the acknowledgement data from the client device, the server device discards the first shared unpredictable secret and stores within the server device the second shared unpredictable secret, which then becomes the correct shared unpredictable secret, wherein the server device no longer accepts the first shared unpredictable secret as the correct shared unpredictable secret.

11. The method of claim 1 further comprising:
    accepting, by the server device and from the client device, any proof data that is generated from any shared predictable secret that is at least as new as the first shared predictable secret for which most recent acknowledgment data has previously been received by the server device.

12. The method of claim 1 further comprising:
    receiving, by the server device from the client device, both the acknowledgment data and second proof data derived from the second shared unpredictable secret using the client proof data generation algorithm and the second proof data does not divulge the second shared unpredictable secret.

13. The method of claim 12 wherein the second proof data also serves as the acknowledgment data.

14. The method of claim 1, wherein the first shared unpredictable secret is generated subsequent to receiving authentication data from the client device, the authentication data showing that a user of the client device is associated with a claimed user account.

15. A non-transitory computer readable storage medium containing computer program instructions for validating a client device by a server device during a registration phase of the client device with the server device, the computer program instructions causing the execution of the following steps:
    generating a first shared unpredictable secret comprising an unpredictable component and a fixed component, wherein the fixed component remains the same during a user log-in phase that occurs after completion of the registration phase;
    storing the first shared unpredictable secret in the server device;
    sending, by the server device, update data to the client device, wherein the update data is to be applied to the first shared unpredictable secret by the client device to generate a second shared unpredictable secret, and wherein the second shared unpredictable secret comprises the same fixed component;
    accepting, by the server device, the first shared unpredictable secret as the correct shared unpredictable secret to validate the client device for requests for validation until the server device receives acknowledgment data to confirm that the client device has replaced the first shared unpredictable secret with the second shared unpredictable secret;

accepting, by the server device, the second shared unpredictable secret as the correct shared unpredictable secret to validate the client device for requests for validation;

receiving, by the server device prior to receiving the acknowledgment data, first proof data from the client device, wherein the first proof data is derived from the first shared unpredictable secret using a client proof data generation algorithm and the first proof data does not divulge the first shared unpredictable secret, wherein the client proof data generation algorithm comprises a one-way function;

verifying, by the server device, the first proof data using a server proof data generation algorithm consistent with the client proof data generation algorithm used by the client device, wherein the server proof data generation algorithm comprises a one-way function; and upon determining, by the server device, that the first proof data presented by the client device was generated from the same first shared unpredictable secret stored in the server device, validating, by the server device, the client device.

16. The non-transitory computer readable storage medium of claim 15, wherein the first shared unpredictable secret is not used as an encryption key for encrypting communication between the client device and the server device.

17. A system for validating a client device by a server device during a registration phase of the client device with the server device, the system comprising:

a memory to store a first shared unpredictable secret in a server device;

at least one processor to:

generate the first shared unpredictable secret, wherein the first shared unpredictable secret comprises an unpredictable component and a fixed component, and wherein the fixed component remains the same during a user log-in phase that occurs after completion of the registration phase;

send, by the server device, update data to the client device, wherein the update data is to be applied to the first shared unpredictable secret by the client device to generate a second shared unpredictable secret, and wherein the second shared unpredictable secret comprises the same fixed component;

accept, by the server device, the first shared unpredictable secret as the correct shared unpredictable secret to validate the client device for requests for validation until the server device receives acknowledgement data to confirm that the client device has replaced the first shared unpredictable secret with the second shared unpredictable secret;

accept, by the server device, the second shared unpredictable secret as the correct shared unpredictable secret to validate the client device for requests for validation;

receive, by the server device prior to receiving the acknowledgment data, first proof data from the client device, wherein the first proof data is derived from the first shared unpredictable secret using a client proof data generation algorithm and the first proof data does not divulge the first shared unpredictable secret, wherein the client proof data generation algorithm comprises a one-way function;

verify, by the server device, the first proof data using a server proof data generation algorithm consistent with the client proof data generation algorithm used by the client device, wherein the server proof data generation algorithm comprises a one-way function; and upon determination, by the server device, that the first proof data presented by the client device was generated from the same first shared unpredictable secret stored in the server device, validate, by the server device, the client device.

\* \* \* \* \*